(12) United States Patent
Kim

(10) Patent No.: US 6,920,104 B2
(45) Date of Patent: Jul. 19, 2005

(54) NEAR FIELD OPTICAL RECORDING DEVICE

(75) Inventor: Soo-Kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 10/013,081

(22) Filed: Dec. 10, 2001

(65) Prior Publication Data
US 2002/0075784 A1 Jun. 20, 2002

(30) Foreign Application Priority Data
Dec. 14, 2000 (KR) ........................................ 2000-76436

(51) Int. Cl.⁷ ................................................ G11B 7/12
(52) U.S. Cl. ................ 369/300; 369/13.33; 369/112.24
(58) Field of Search ............................ 369/300, 13.33, 369/112.24

(56) References Cited

U.S. PATENT DOCUMENTS

| 5,343,447 A | * | 8/1994 | Okabe et al. ............. 369/13.17 |
| 5,351,229 A | * | 9/1994 | Brezoczky et al. ........... 369/99 |
| 6,307,832 B1 | * | 10/2001 | Novotny et al. ............ 369/300 |
| 6,324,130 B1 | * | 11/2001 | Hatam-Tabrizi et al. . 369/13.17 |
| 6,344,949 B1 | * | 2/2002 | Albrecht et al. ......... 360/236.5 |
| 6,529,449 B1 | * | 3/2003 | Jordan et al. ............ 369/13.33 |

FOREIGN PATENT DOCUMENTS

| JP | 63-013180 | 1/1988 | |
| JP | 63-161514 | 7/1988 | |
| JP | 03-041679 | 2/1991 | |
| JP | 07-302432 | 11/1995 | |
| JP | 08235556 A | * 9/1996 | ............ G11B/5/60 |
| JP | 11-259894 | 9/1999 | |
| JP | 2000-057648 | 2/2000 | |
| JP | 2000-242957 | 9/2000 | |
| JP | 2001076362 A | * 3/2001 | ............ G11B/7/12 |

OTHER PUBLICATIONS

Translation of JP08235556A provided by the Japanese Patent Office website.*

* cited by examiner

Primary Examiner—Brian E. Miller
Assistant Examiner—Michael V. Battaglia
(74) Attorney, Agent, or Firm—Lee, Hong, Degerman, Kang & Schmadeka

(57) ABSTRACT

A near field optical recording device for recording or reproducing information by making a near field light incident on a recording medium, in which an air induction channel is formed extended from an outside to a collective lens at a head slider where the collective lens is mounted facing near the surface of the recording medium. In an optical recording and reproducing, the temperature rise in the collective lens being close to the surface of the recording medium due to the heat energy generated by the light made incident on the surface of the recording medium can be restrained.

23 Claims, 5 Drawing Sheets

NEAR FIELD OPTICAL RECORDING DEVICE

BACKGROUND OF THE INVENTION

1. Field of the Invention

The present invention relates to a near field optical recording device, and more particularly, to a near field optical recording device having a lens overheat preventing unit at a head slider where a collective lens is mounted.

2. Description of the Background Art

As for an optical recording medium or an optical magnetic recording medium, a bit (or a recording mark) size should be minimized and a track width is to be reduced to have a high density recording capacity.

However, since the spot size of light focussed on the recording medium is restricted by a diffraction limitation, there is a limitation to improve the recording density.

For processing a large amount of data, a new optical recording method is required overcoming the limitation of the conventional optical recording method.

Recently, researches have been conducted on a near field recording and reproduction by using a near field optics, which is expected to remarkably improve the recording density.

A principle of the near field optical recording and reproduction is as follows. When light goes from layer with higher n (index of refraction) to layer with lower n, some of the light is reflected. If light progresses through a lens at an angle more than a critical angle, the light is totally reflected at the surface of the lens. In this case, due to the total reflection of the light, there is a light with a fine strength on the opposite surface of the lens, which is called evanescent wave.

Using the evanescent wave allows a high resolution which has been impossible due to the diffraction limitation of light in the existing far-field.

In the near field optical recording and reproducing optical system, light is totally reflected on a collective lens to generate an evanescent wave on the surface of the lens, and the recording and reproduction are performed by coupling the evanescent wave and the surface of recording medium.

As for an optical head of a near field optical recording device, in order to use near field light for recording, the space between an optical lens and recording medium should come within a range smaller than the wavelength of light.

The temperature on the surface of a recording medium goes up as the light is focussed during the recording and reproducing process. When the optical head nears onto the surface of the recording medium, thermal energy of the surface of the recording medium is transferred to the near field optical lens mounted on the optical head. Accordingly, the temperature of the lens being close to the surface of the recording medium goes up.

The lens of the near field optical recording device is very small and sensitive to the influence of temperature. Thus, if the lens is overheated, the light transmittance characteristic of the lens is changed due to a heat distortion of the lens, making it difficult to form an accurate beam spot.

In addition, the heat distortion affects optical characteristics (i.e., a refractivity or Numerical Aperture, etc.) of the lens, resulting in change to the recording and reproducing characteristics.

In case of the optical magnetic recording, the temperature of a recording film of the recording medium should be heated by above a curie point. Thus, the temperature of the recording film within the beam spot should be increased to above 200° C. for recording, and in case of recording of a phase change, the temperature of the recording film should be increased by above 600° C.

In case of typical optical recording devices such as CD or DVD, the temperature increase in the recording film was not a big problem because the lens is spaced apart from the recording film by about 1 mm.

In case of the near field optical recording device, however, the space between the lens and the recording film is only as far as about 50–100 nm, so that the temperature increase in the recording film causes the heat distortion to the lens and a corresponding optical characteristic change, causing a serious problem to recording and reproducing.

Consequently, in case of the near field optical recording device that the surface of the recording medium and the surface of the lens are to come very closely, it is required to restrain the temperature increase of the lens to the utmost, unlike the typical far-field recording.

SUMMARY OF THE INVENTION

Therefore, an object of the present invention is to provide a lens overheat preventing unit of a near field optical recording device which is capable of preventing the lens from overheating.

Another object of the present invention is to provide a lens overheat preventing unit by changing a structure of a head assembly without adding a separated device or without any big modification to an existing device.

Still another object of the present invention is to provide a lens overheat preventing unit that is adoptable even to an optical recording device in various forms using a near field.

To achieve these and other advantages and in accordance with the purpose of the present invention, as embodied and broadly described herein, there is provided a near field optical recording device for recording or reproducing information by making a near field light incident on a recording medium, in which an air induction channel is formed at a head slider where a collective lens is mounted.

To achieve the above objects, there is also provided a near field optical recording device including: a recording medium for recording optical information; a first driving unit for rotating the recording medium; an optical pick-up unit having a light source and light modulation unit; a second driving unit for rotating the optical pick-up unit; a head assembly including a head slider being positioned at an upper surface of the recording medium and having at least one lens mounted thereon, the head slider having an air induction channel starting from the outside of the head slider to the lens, and a connection unit for connecting the head slider and the optical pick-up unit.

In the near field optical recording device of the present invention, at least one air induction channel is formed at the head slider, and preferably, at least two air induction channels are formed. It is preferred that the air induction channel renders air to flow into the head slider according to an air flow naturally generated as the recording medium is rotated. The rotation direction of the recording medium and the direction of the air induction channel preferably correspond.

In the near field optical recording device of the present invention, besides the air induction channel, an extra air discharge hole may be formed at the head slider.

In the near field optical recording device of the present invention, a collective lens and an objective lens are mounted at the head slider, or only one collective lens may be mounted.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
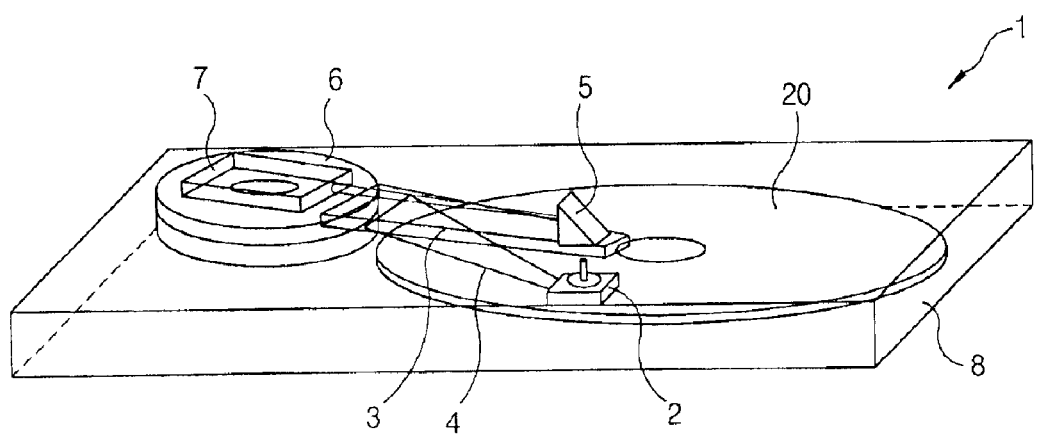
FIG. 1A shows a head assembly of a near field optical recording device.

FIG. 1A is a perspective view showing a head assembly of a near field optical recording device.

As shown in FIG. 1A, a disk 20, a recording medium, is rotatably installed in a deck 8 in such a manner that its central portion is mounted at a spindle motor (not shown), and a recording and reproducing device is installed at the other side therein.

A flying head slider 2 is supported by a suspension arm 3 at the upper surface of the disk, and one side of the suspension arm is connected to a pick-up unit 7.

A voice coil motor (VCM) 6, a driving means, is installed at a lower portion of the pick-up unit so that the pick-up unit can be rotated at a certain range of angle.

A fixing arm 4 is installed supported by the pick-up unit at the upper surface of the head slider, and a prism 5 is installed at the end of the fixing arm.

Light generated from a light source (not shown) of the pick-up unit is changed in its path at the prism, passing the lens 9 mounted at the head slider and finally made incident on the surface of the disk. Thanks to the interaction between the incident light and the surface of the disk, light information can be recorded or reproduced.

Figure 1B:
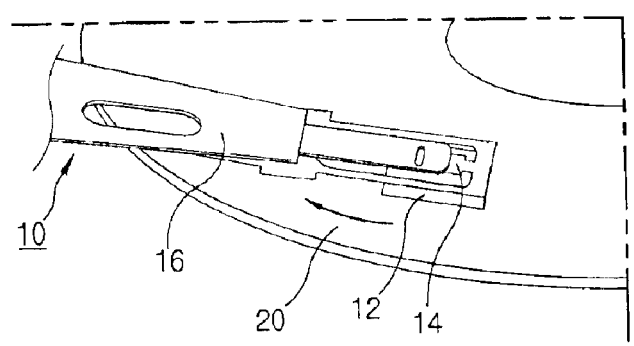
FIG. 1B shows a head slider of the near field optical recording device.

FIG. 1B is a front sectional view showing a head slider of the near field optical recording device.

As shown in FIG. 1B, an air sliding head assembly 10 is positioned spaced apart with a narrow distance on the upper surface of the disk 20, the recording medium.

The head includes a slider 12 mounting the lens, a gimbal 14 being an elastic member, for connecting the slider to a different component, and a suspension arm 16, an elastic member, being connected to the slider through the gimbal 14.

An infinitesimal movement in the vertical direction of the slider 12 is restricted by the elasticity of the gimbal 14, and an initial load and position of the slider are determined by the suspension arm 16.

When the disk 20 is rotated, an air flow occurs at a lower surface of the slider, and a pressure according to the air flow makes the slider to float.

Until the flotation force according to the air flow, the initial load of the suspension arm and the weight of the slider are balanced, the slider is floated from the disk surface to a certain height. The height is so called a flying height.

Figure 1C:
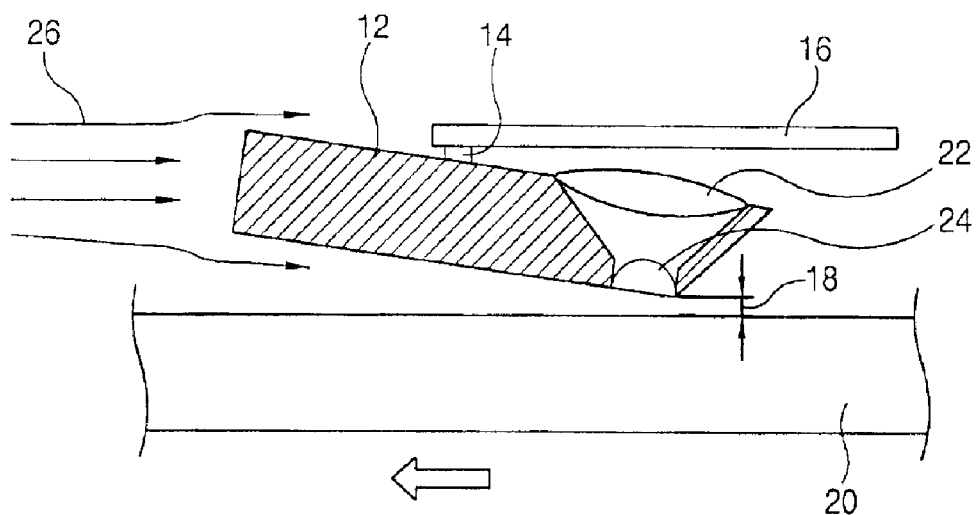
FIG. 1C shows a head slider of the near field recording device.

FIG. 1C shows a head slider of the near field recording device.

As shown in FIG. 1C, an objective lens 22 and a solid immersion lens (SIL) as a collective lens 24 facing the surface of the recording medium are mounted at the slider 12. The slider 12 is supported by the gimbal 14 and the suspension arm 16.

When the disk 20 is rotated, the slider is floated on the surface of the disk owing to the air flow generated at the lower surface of the slider and performs recording or reproducing.

The flying height 18 is as high as 50~100 nm, far shorter than the wavelength of light used for optical recording.

In recording data, light transmitted from a light generating unit such as a laser diode forms an infinitesimal spot beyond a diffraction limitation of light on the surface of the disk.

In this respect, if the temperature increase of the lens being close to the surface of the recording medium can be restrained by using the air flow which serves to float the slider, no additional cooling unit or an overheat preventing unit would be required.

In the present invention, the lens mounted at the slider of the head assembly is cooled by using the air flow generated when the disk is rotated.

Figure 2:
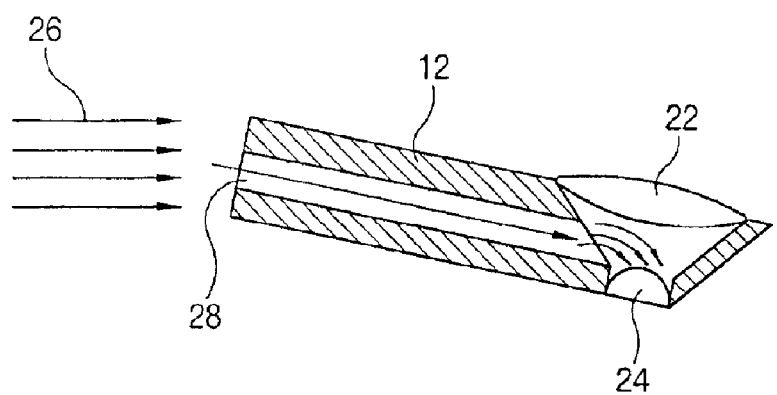
FIG. 2 shows a head slider of a near field optical recording device in accordance with a preferred embodiment of the present invention.

FIG. 2 is a front sectional view showing a head slider of a near field optical recording device in accordance with a preferred embodiment of the present invention.

As shown in FIG. 2, air flow 26 is introduced into the slider 12 where the lens is mounted. A long and small air induction channel 28 is formed inside the slider.

The air introduced into the air induction channel flows to the space between an objective lens 22 and a collective lens 24 adjacent to the surface of the disk.

Such air flow drops the increased temperature of the collective lens by a heat exchange, and accordingly, the temperature of the lens facing the surface of the disk is not increased to higher than a certain level.

The air induction channel can be formed in various forms according to the form of the head slider.

In order to facilitate introducing of the air flow into the slider, it is preferred that the direction of the air induction channel corresponds the direction of the air flow.

Figure 3A:
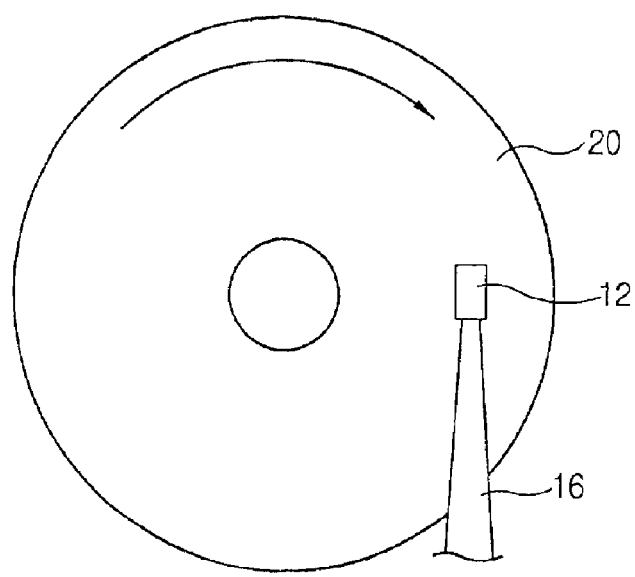
FIG. 3A shows one arrangement of a head assembly floated on an upper surface of the disk in accordance with the preferred embodiment of the present invention.
Figure 3B:
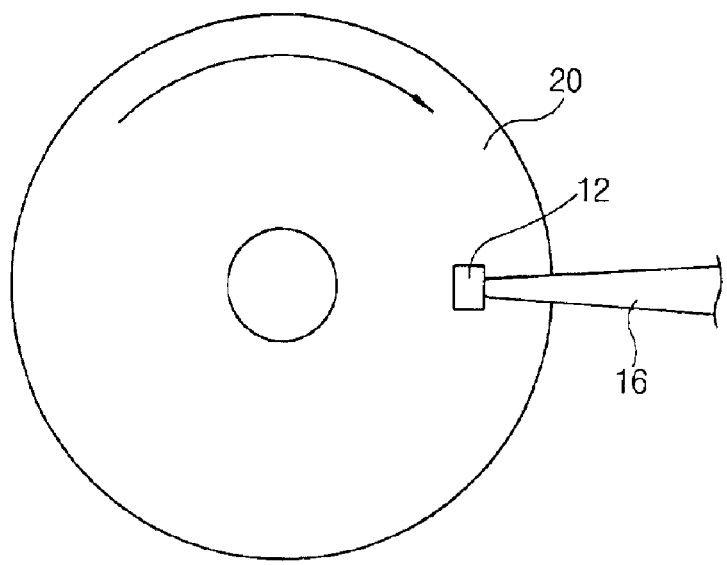
FIG. 3B shows another arrangement of a head assembly floated on an upper surface of the disk in accordance with the preferred embodiment of the present invention.

FIGS. 3A and 3B show that the positions of the head assembly floated on the upper surface of the disk are different.

With reference to FIG. 3A, since the suspension arm 16 is positioned in parallel to the tangent line on the circumference of the disk 20, the direction of the air induction channel (not shown) formed at the slider 12 is to correspond to the direction of the tangent line.

Meanwhile, with reference to FIG. 3B, since the suspension arm is positioned vertically to the direction of the tangent line on the circumference of the disk, the slider 12 is positioned after being rotated as much as 90° compared to the embodiment of FIG. 3A, so that the air induction channel can correspond to the tangent line direction.

Figure 4A:
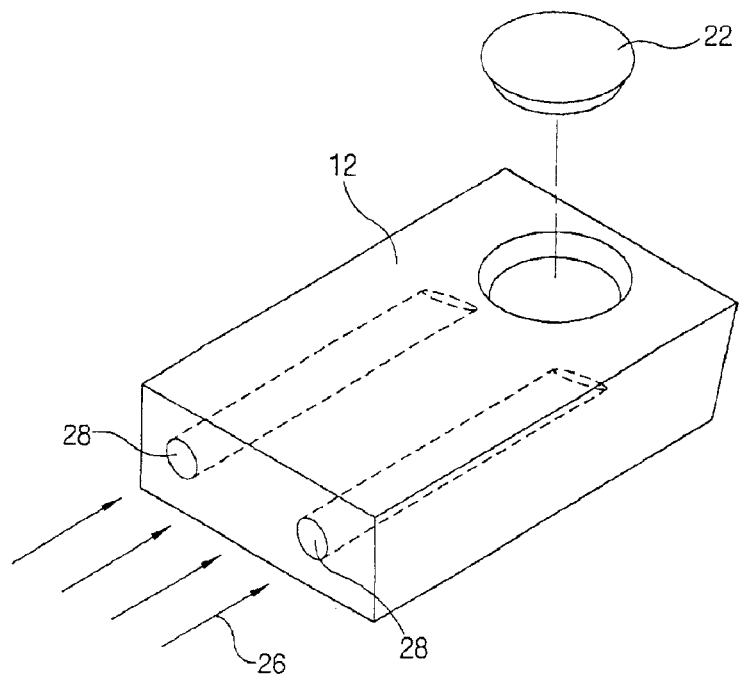
FIG. 4A shows a near field optical recording device in accordance with one embodiment of the present invention.
Figure 4B:
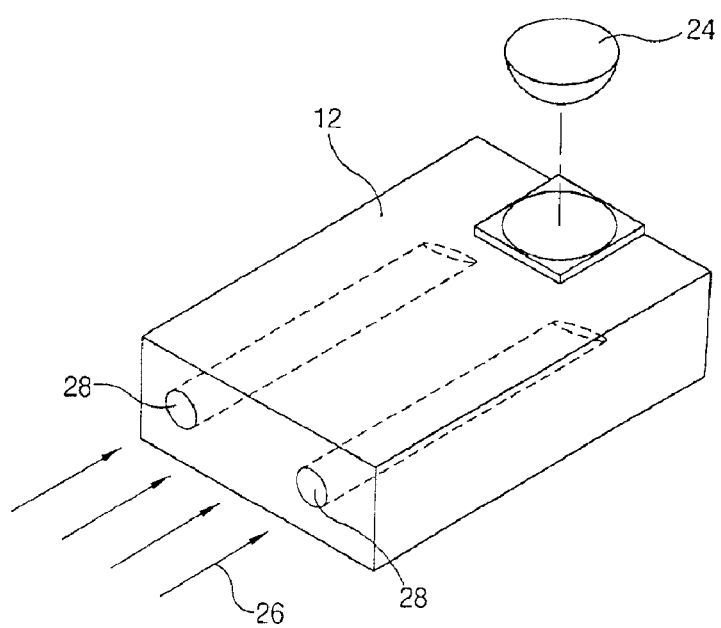
FIG. 4B shows a near field optical recording device in accordance with another embodiment of the present invention.

FIGS. 4A and 4B illustrate embodiments of the header slider in accordance with the present invention.

FIG. 4A shows that the air induction channel is formed at an upper portion of the slider where the object lens is mounted in accordance with one embodiment of the present invention.

As shown in FIG. 4A, a channel 28 is formed extended from an entrance of one end face of the slider 12 to the objective lens 22, as a passage for receiving and discharging air.

FIG. 4B shows that the air induction channel is formed at a lower portion of the slider where the opposite lens is mounted in accordance with another embodiment of the present invention.

As shown in FIG. 4B, a temperature of the collective lens 24 being close to the surface of the disk can be reduced by the air introduced through the channel 28.

For the collective lens, SIL may be used and various forms of lenses used for the near field optical recording device can be adopted, without being limited thereto. Accordingly, the present invention can be adopted to a near field optical recording device using other lenses as well as the near field optical recording device using the SIL.

The length and the size of the air induction channel are different depending on the size of the slider.

The air induction channel may have a form that ends of two channels are connected to each other. In such a case, one of the channels serves as an air induction hole while the other services as a discharge hole.

In addition, more than one channels may be formed penetrating the slider.

Figure 5A:
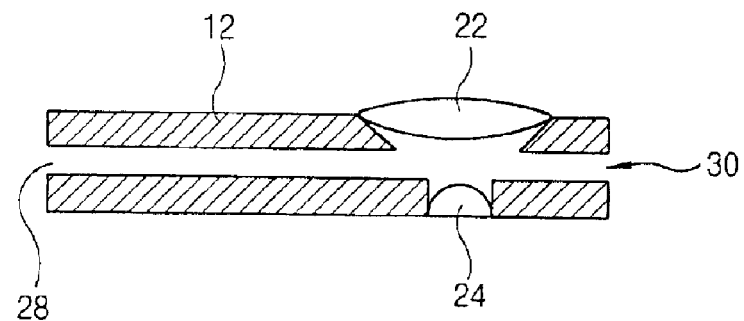
FIG. 5A shows a head assembly having an air discharge hole.
Figure 5B:
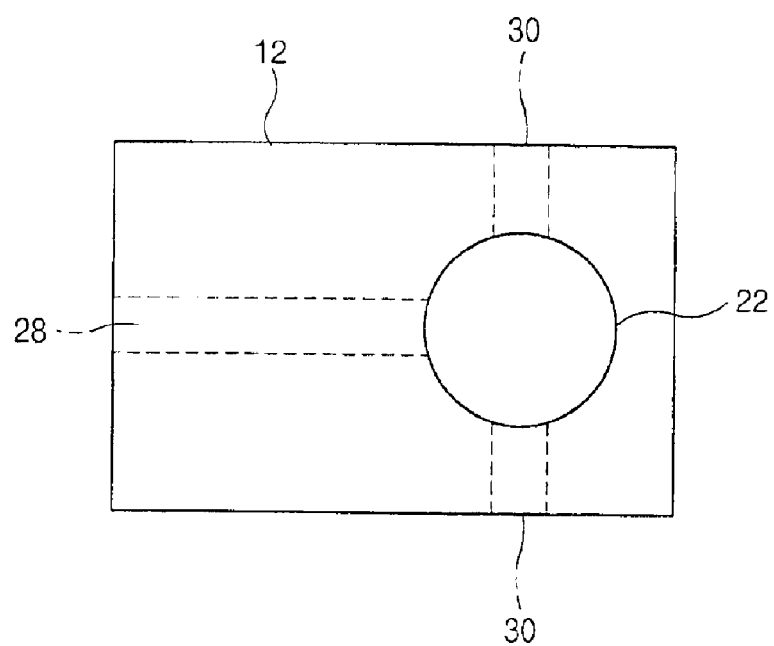
FIG. 5B shows another head assembly having air discharge holes.

The air discharge hole can be possibly formed any portion of the front, rear, left and right face of the slider FIGS. 5A and 5B show examples of the head slider having the air discharge hole as formed.

With reference to FIG. 5A, an air induction channel 28 is formed at one side in the head slider 12, and a discharge hole 30 is formed at the other side in the slider. The temperature of the air introduced into the air induction channel is restrained from increasing by the heat exchange with the collective lens 24 or the objective lens 22, and exhausted through the discharge hole.

On the drawing, the air induction channel and the discharge hole have the same height. But they may be formed in a different height to each other so that the air flow can be exhausted as it is through the discharge hole without contacting the lens.

FIG. 5B shows a head slider where a discharge hole is formed in a different type.

In this embodiment, a discharge hole 30 is formed at the left and right side faces of the slider at the right angle to the direction of the air induction channel 28. Accordingly, the air introduced into the slider through the air induction channel is heat-exchanged with the lenses 22 and 24 sufficiently and then exhausted through the discharge hole 30.

The discharge hole may be formed at the upper surface or the lower surface of the slider.

In the above embodiments, the head slider where the objective lens and the collective lens are all mounted was described. But even in case of a head slider where only the collective lens is mounted without the objective lens, the air induction channel and the air discharge hole can be formed in the same manner.

As so far described, the near field optical recording device of the present invention has many advantages.

That is, for example, first, in an optical recording and reproducing, the temperature rise in the colletive lens being close to the surface of the recording medium due to the heat energy generated by the light made incident on the surface of the recording medium can be restrained.

Accordingly, the optical characteristic of the lens is restrained from changing in the process of recording and reproducing by the near field optical recording device, so that a reliability of the device can be heightened.

In addition, formation of the air induction channel in the slider of the optical head assembly solves the problem of temperature rise without adding a separate device or without modification to the existing device. Thus, its production cost is expected not too much increased and adoptable to optical recording device in various forms using the near field.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A near field optical recording device comprising:
   a first driving unit for rotating a recording medium;
   an optical pick-up unit having a light source and light modulation unit;
   a second driving unit for rotating the optical pick-up unit;
   a longitudinal head slider having first and second ends positioned over an upper surface of a recording medium;
   an objective lens mounted on the first end and a first surface of the head slider for focusing light generated from the optical pick-up unit; and
   a collective lens mounted on the first end and a second surface of the head slider approximately opposite the objective lens for guiding the focused light to the recording medium, the head slider having an air induction channel extending longitudinally from the first end to the second end through the head slider, formed between and separating the objective lens and the collective lens.

2. The device of claim 1, further comprising a connection unit for connecting the head slider and the optical pick un unit.

3. The device of claim 1, wherein the head slider comprises at least two air induction channels are extending longitudinally through the first end to the second end of the head slider.

4. The device of claim 1, wherein the longitudinal direction of the air induction channel is the same as the rotational direction of the recording medium.

5. The device of claim 1, wherein the collective lens is a solid immersion lens.

6. The device of claim 1, wherein an air discharge hole is additionally formed at the head slider.

7. The device of claim 6, wherein the air discharge hole is formed corresponding to the direction of the air induction channel.

8. The device of claim 7, wherein the air discharge hole is formed to have a different height as that of the air induction channel.

9. The device of claim 6, wherein the air discharge hole is formed at a right angle to the direction of the air induction channel.

10. The device of claim 9, wherein the air discharge hole is formed at left and right side faces of the head slider.

11. The device of claim 9, wherein the air discharge hole is formed at an upper face or at a lower face of the head slider.

12. The device of claim 1, wherein the head assembly is positioned in parallel to the rotational direction of the recording medium.

13. The device of claim 1, wherein the head assembly is positioned at a right angle to the rotational direction of the recording medium.

14. The device of claim 1, wherein the air induction channel renders the air flow generated according to the rotation of the recording medium to be introduced into the head slider.

15. A near field optical recording device comprising:

a longitudinal head slider configured to be mounted on an optical pick-up unit positioned over an optical recording medium, the head slider having first and second ends;

an objective lens mounted on the first end and a first surface of the head slider for focusing light generated from the optical pick-up unit;

a collective lens mounted on the first end and a second surface of the head slider approximately opposite the objective lens for guiding the focused light to the recording medium, the head slider having a first air induction tunnel formed between the objective lens and the collective lens, the first air induction tunnel extending longitudinally from the first end to the second end through the head slider.

16. The device of claim 15 wherein the head slider has a second air induction tunnel formed between the objective lens and the collective lens, the second air induction tunnel extending laterally from a first side to a second side through the head slider.

17. The device of claim 16, wherein the first and second air induction tunnels cross.

18. The device of claim 16, wherein at least one orifice is formed at the first side of the head slider to provide a third external opening for the second air induction tunnel.

19. The device of claim 18, wherein at least one orifice is formed at the second side of the head slider to provide a fourth external opening for the second air induction tunnel.

20. The device of claim 19, wherein at least one orifice is formed at the first and second ends of the head slider to provide first and second openings, respectively for the first air induction tunnel.

21. The device of claim 15, wherein the head slider has a second air induction tunnel formed between the objective lens and the collective lens, the second air induction tunnel extending longitudinally from the first end to the second end of the head slider parallel to the first air induction tunnel.

22. The device of claim 15, wherein at least one orifice is formed at the second end of the head slider to provide a first external opening for the first air induction tunnel.

23. The device of claim 15, wherein at least one orifice is formed at the first end of the head slider to provide a second external opening for the first air induction tunnel.

* * * * *